United States Patent Office.

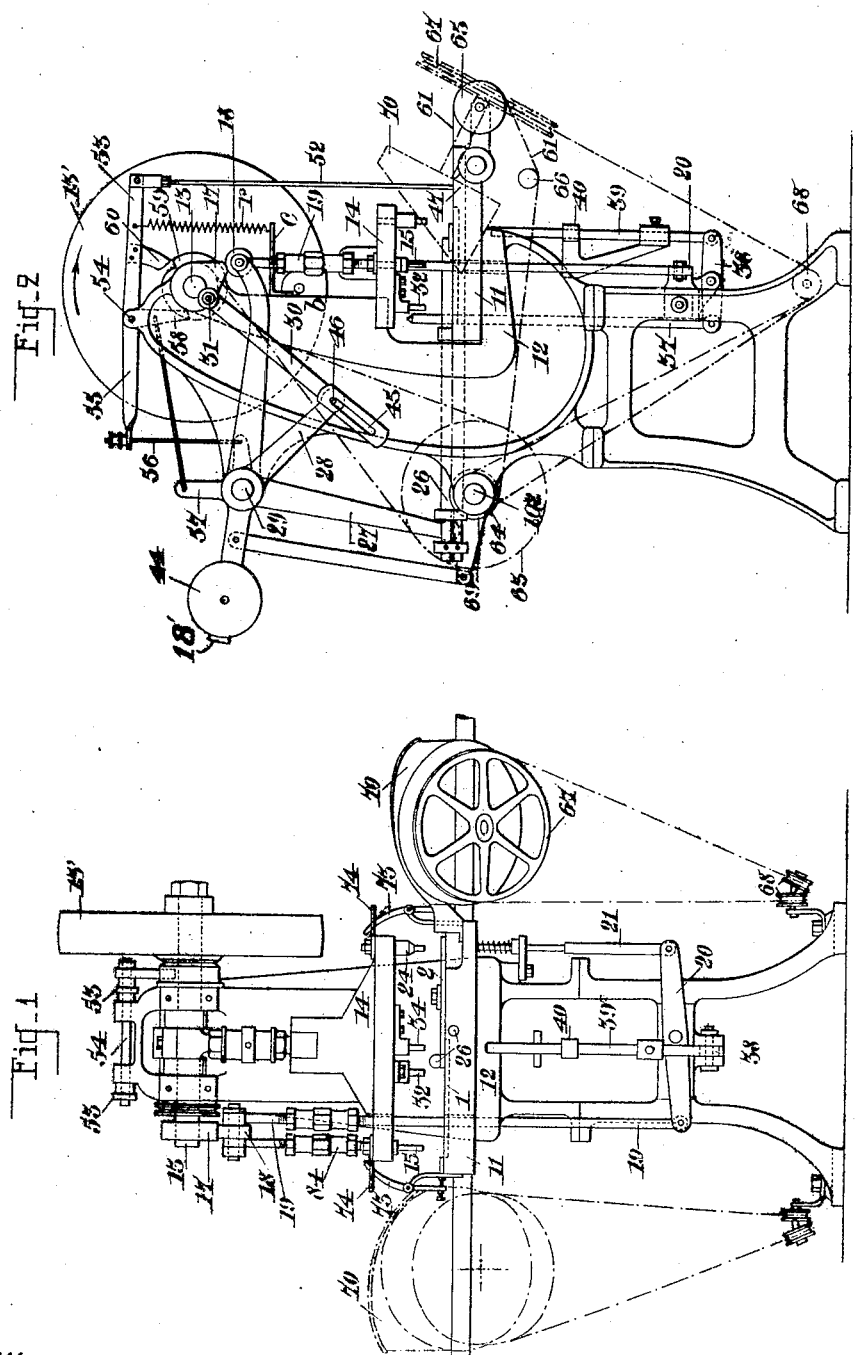

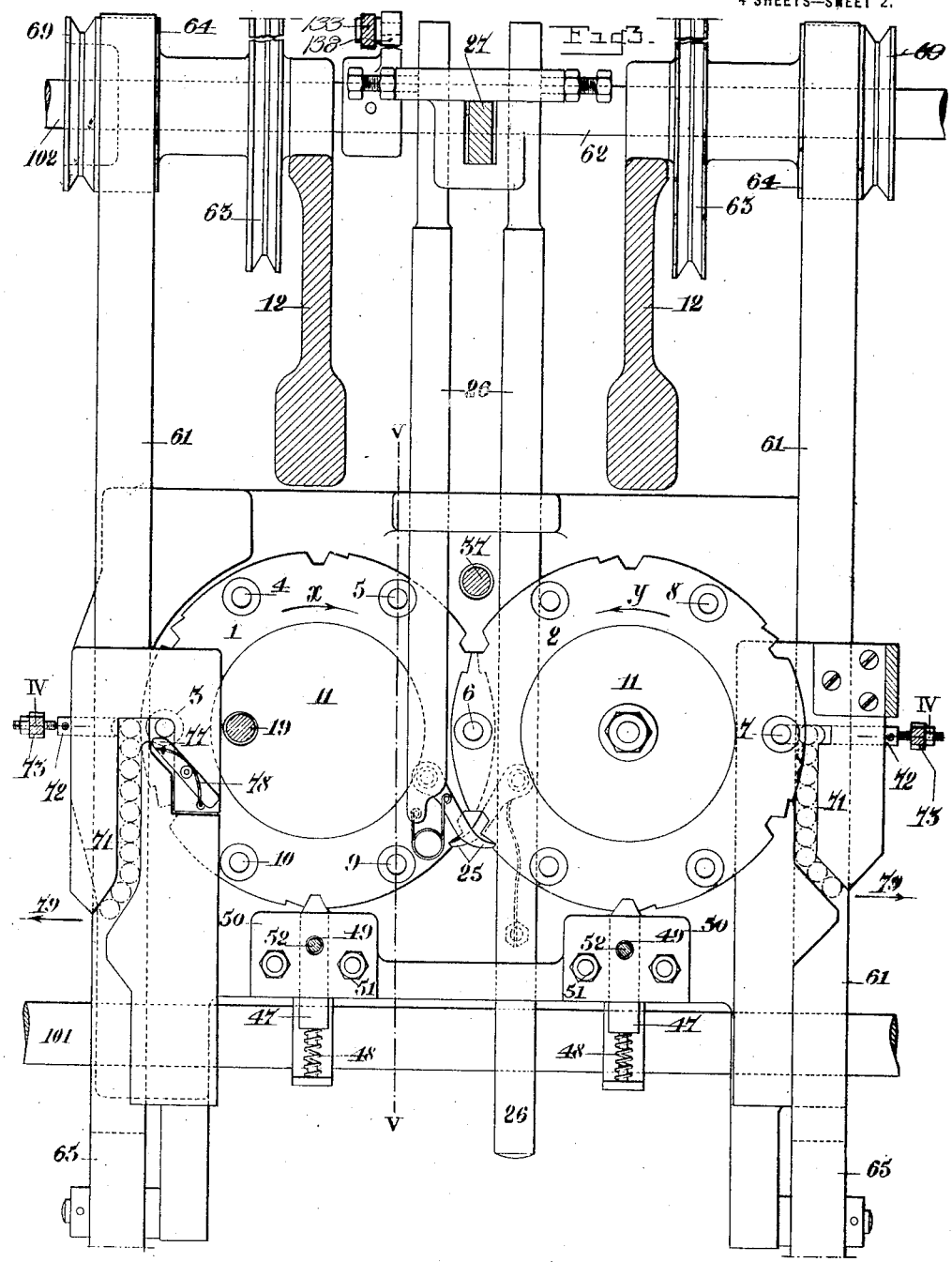

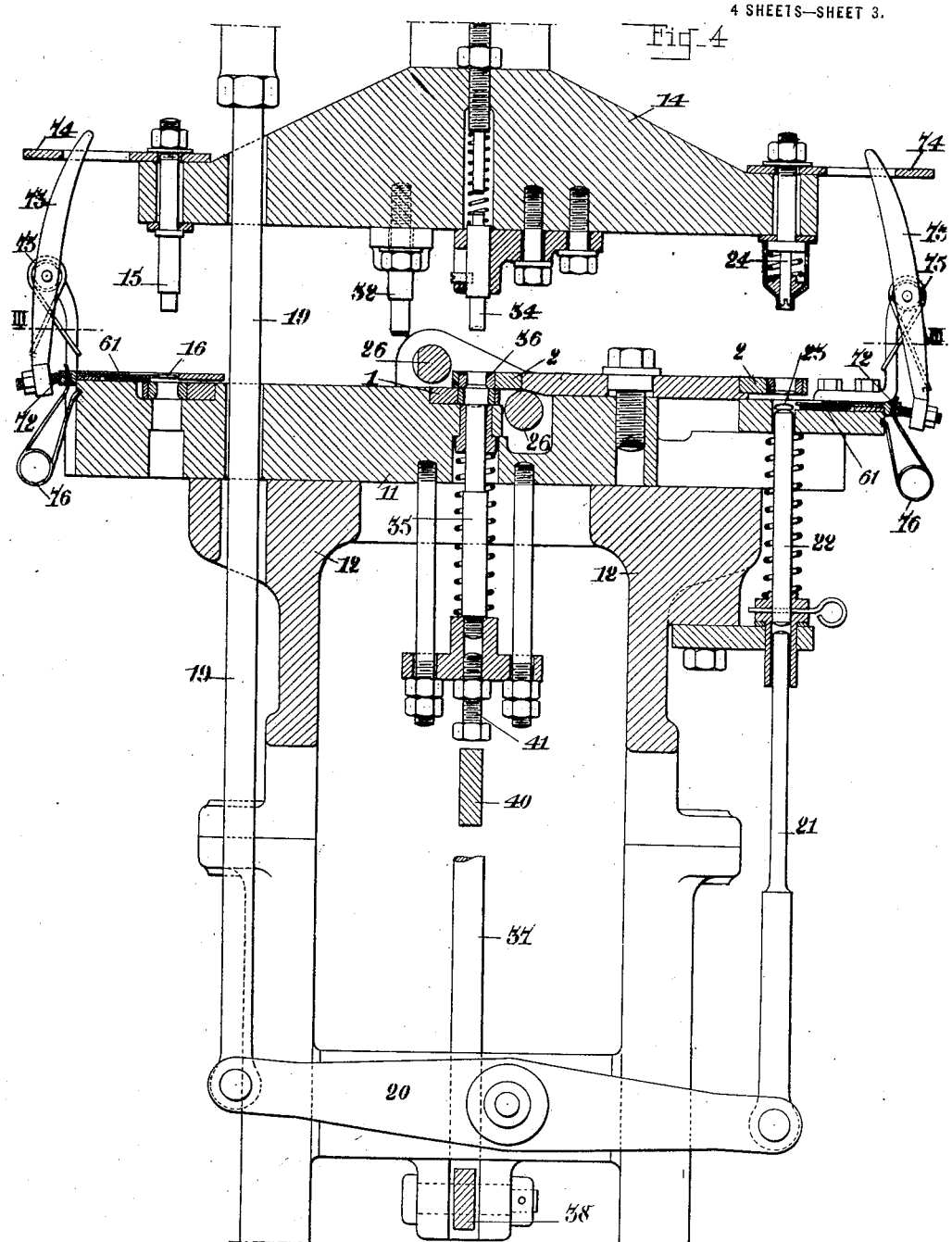

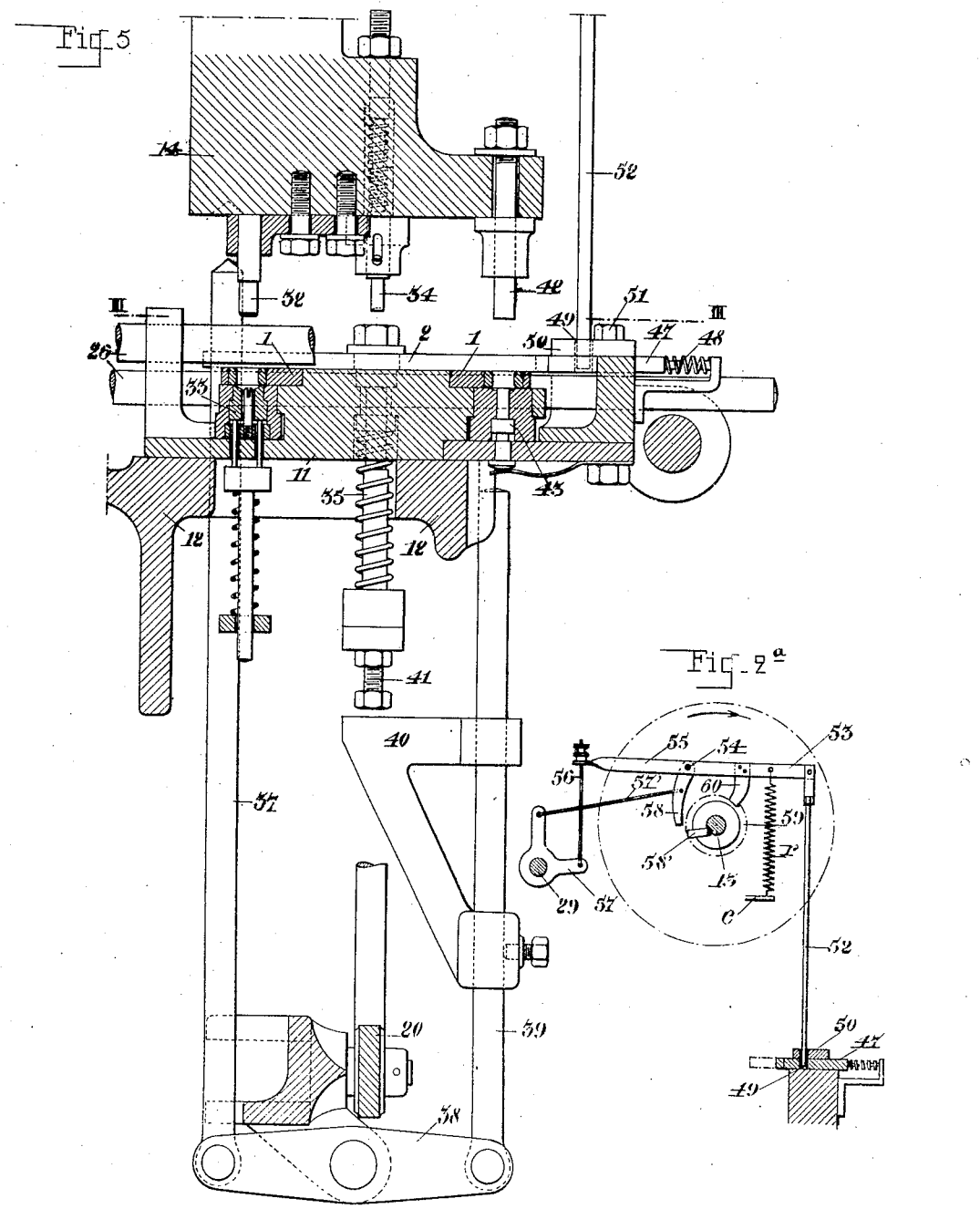

HENRI TOURNEUR, OF PARIS, FRANCE.

MACHINE FOR MAKING METAL BUTTONS.

1,347,235.  Specification of Letters Patent.  Patented July 20, 1920.

Application filed May 14, 1914. Serial No. 838,453.

*To all whom it may concern:*

Be it known that I, HENRI TOURNEUR, citizen of the Republic of France, residing at Paris, France, have invented new Improvements in Machines for Making Metal Buttons, of which the following is a specification.

In the manufacture of buttons, the designs to be made are extremely varied, both as regards the shape and also as regards the nature of the materials employed.

The known automatic machines are not capable of satisfying these varying conditions and as a result their limited application makes their use quite unprofitable and without practical advantage.

The automatic machine forming the object of the present invention has the advantage that its two main work-supporting members can be fed as desired:

(1) With sheets of metal, cardboard, etc., which will be held and displaced automatically in front of the tools in such a manner as to cut off the necessary pieces with maximum effect.

(2) With objects previously partly shaped, this being necessary for certain designs of complex shape. These partly-shaped objects may be fed to tools either automatically by means of hoppers in which they are contained, or again, by hand without any risk to the workman, this latter being the more advantageous procedure in certain cases.

The drawing annexed to the specification represents, by way of example, one of the forms which this machine can take.

In this drawing:

Figure 1 is a general view of the machine from the front. In order to simplify matters, it is to be assumed in this figure that the machine is supplied with bushes and cups previously beaten out and lodged in two distributing boxes in one part or another of the machine.

Fig. 2 is a side elevation in which the distributing boxes have been removed for more clearness.

Fig. 2ª is a detail of Fig. 2, representing the device at the bottom of its path.

Fig. 3 is a horizontal section to a larger scale on the line III—III of Figs. 4 and 5.

Fig. 4 is a transverse section to the same scale on the line IV—IV of Fig. 3.

Fig. 5 is a similar section on the line V—V of Fig. 3.

The same reference characters refer to the same parts in the different figures.

The machine comprises two plates 1 and 2 for supporting the objects (Figs. 3, 4 and 5) which plates turn in the direction of the arrows $x$, $y$ (Fig. 3). The plate 1 is intended for the bush and the plate 2 for the cap of the button.

The bush plate 1 receives the beaten out bush at 3 (Fig. 3) which is then perforated and stamped at 4 or 5, then passed to 6. The stamping intended to form the cap is shaped at 7 (and at 8 if there is need) and then is passed exactly above the bush at 6 where the cap and bush are assembled. The button is closed at 9 and falls down finished at 10.

The two plates are mounted upon a cast block 11 (Figs. 4 and 5) which is itself secured to the main frame 12 of the machine, upon which are fixed the bearings supporting the shafts for effecting the different movements.

These different movements take place in the following manner:

The driving shaft 13 (Figs. 1 and 2) driven by the fly wheel 13′ operates the cross-head 14 by a crank and connecting rod or any other similar known means. The cross-head 14 is of suitable shape and upon it the movable tools are fixed and notably the stamp 15 which engages the bush 16 in the plate 1 (Fig. 4). A cam 17 (Fig. 1) upon the said driving shaft engages the roller 18, and drives the parts 19, 20 and 21, the last-mentioned part operating the punch 22 (Fig. 4) which replaces the cap 23 after having coöperated with the tool 24 in splitting it and stamping it. The roller 18 is carried by one end of an arm or lever 18′ which is fulcrumed intermediate its ends on a stud 29 and carries at its other end a counterweight 44 or equivalent device subsequently referred to. The parts 19 and 21 are constituted by reciprocating bars which are connected at their lower ends by the interposed double rocker 20.

The plates then turn a part of a revolution (one-sixth in the drawing) under the action of the pawls 25 (Fig. 3) fixed upon the rods 26 which are reciprocated by a bell-crank comprising levers 27 and 28 (Fig. 2), rocking about the stud 29 under the action of the link 30 which is connected at one end with the free end of lever 28 and at the other end with the crank pin 31, the latter being fixed to cam 17.

By the rotation of the plate 1 the bush arrives at 4, then at 5, where co-acting splitting and stamping tools, such as 32, are situated (Figs. 4 and 5).

The two parts (bush and cap) properly shaped then arrive at 6 (Fig. 3) in convenient relative positions for assembling, the cap being above the bush.

They are then assembled by the co-acting tools 34 and 35 (Figs. 4 and 5), the tool 34 operating first and thrusting the cap downward into the bush while the tool 35, then moving upward raises the assembled cap and bush and pushes them against the ring 36.

The movement of the tool 35 is obtained by a mechanism comprising a pair of vertical bars 37 and 39 and an interposed rocker 38, the bar 37 receiving its movement from the cross-head 14 at the bottom of its stroke. The bar 39 carries an impact member or block 40, which strikes against a screw 41 connected with the lower end of said tool 35, said screw allowing of adjustment.

The two assembled parts are then taken to 9 (Fig. 3) where the tools 42 and 43 (Fig. 5) finish the locking operation commenced at 6.

The finished button is conducted to 10 where it falls through a hole in the plate 11 into a suitable receptacle.

These different tools can be varied as regards their shape and their arrangement according to the nature of the objects to be made.

In addition, the machine is provided with a safety arrangement intended to prevent accidents which could take place upon the parts or upon the tools in cases in which defective parts would block the machine.

According to this arrangement, the movement of the plates is produced by the weight 44 (Fig. 2), which is mounted on the roller-carrying arm 18', or by a spring acting in an equivalent manner, and the lower end of the link 30 is formed with an elongated eye 45 in which is engaged a pin 46 fixed to the lower end of the lever arm 28. By this means, an accidental blocking of the plates 1 and 2 will prevent their rotation while supporting the weight 44, as shown in Fig. 2; the driving shaft 13 then continuing its rotation under the action of the belt and the inertia of the fly wheel, the slide 45 will slide upon the pin 46 without rocking the lever arm 28 and without any damage, the effort which it exercises upon these parts being always limited to that which the weight 44 exercises. Without this precaution the inertia of the fly wheel would inevitably smash some part of the machine.

The movement of each plate is controlled by a stop finger 47 (Figs. 2, 2$^a$, 3 and 5) pressed forward by a spring 48. This finger engages in the corresponding notches of the plate in succession. It is pushed back and its spring is compressed under the action of the plate.

Each finger 47 is formed with a hole 49 which in the stop position coincides exactly with a corresponding hole in a plate 50 secured to the framework by two screws 51.

A pair of bars 52 pivoted to a pair of levers 53 keyed upon the shaft 54 (Figs. 2 and 2$^a$) can engage in the holes in each of the associated stop fingers and plates (Figs. 2, 2$^a$, 3 and 5). As an extension of one of these levers 53 or independently of it, the lever 55 is fixed on this same shaft 54 (Figs. 2 and 2$^a$) which operates an uncoupling pawl 58 through the rod 56 by the movement of the bell-crank lever 57 and the rod 57', the said pawl being pivoted on said shaft.

The mechanism just described is actuated by a cam 59 keyed upon the driving shaft 13 and by a spring $r$ fixed at one end to the lever 53 and at the other end to a bracket $c$ mounted upon the frame $b$ of the machine.

The operation of this mechanism is as follows:—

Before the supporting plates begin their movement the cam 59 acting upon the nose 60 fixed to the lever 53 (Figs. 2 and 2$^a$) causes the levers 53 and the bars 52 to be raised; the fingers 47 are freed and the plates can rotate by pushing back the fingers, which compresses their springs 48.

The plates having finished their movement correctly the fingers 47 engage in the new notches in the plates owing to the thrust of the springs. At this moment the cut-away portion of the cam 59 comes under the nose 60 and the levers 53 descend, assisted by the spring $r$, thereby raising the lever 55, which pulls rod 56 upward and, in consequence, rocks the bell-crank lever 57 counterclockwise. The members 57, 57' then draw the pawl 58 rapidly toward the left (Fig. 2$^a$), which disengages said pawl 58 from a coupling key 58' which thereupon automatically couples the fly wheel 13' to the driving shaft 13 under the influence of its controlling spring (not shown). The fly wheel then actuates said driving shaft, and the machine continues its normal operation until cam 59 again raises the parts 60 and 53 and depresses part 55, whereupon bell-crank lever 57 is rocked clockwise and, through the agency of rod 57' swings the unclutching pawl 58 into the path of key 58'. When the latter is struck by pawl 58, it uncouples the fly wheel from the driving shaft, the fly wheel then rotating freely on said shaft without turning it.

If, for any reason whatever, one of the plates does not finish its movement or passes its normal position the corresponding finger 47 could not take its place and the descending movement of the rod 52 would become impossible, the system 53, 55, 56, 57 could not be rocked and the pawl 58 would stop the projection 58' disconnecting the clutch and the machine will be instantaneously stopped.

Owing to these two combinations accidental blocking of the machine would simply cause the machine to stop without any damage.

This entire cycle of movements is essentially arranged in such a manner as to allow the machine to be fed in the different manners indicated below.

(1) The machine can be fed with bushes hammered previously on multiple tool machines and on double acting machines of the type generally employed or with parts partly shaped by any means whatever.

(2) The machine can be fed by hand by the workmen who place the pieces to be shaped and assembled on the bands.

*Feeding with pieces previously shaped.*

Figs. 1, 2, 3, 4 and 5 relate to the first method of feeding. The hoppers 70 which may be of any desired construction are shown only in the complete views; they being driven by small belts passing over pulleys 67, 68 and 69 (Figs. 1, 2 and 3). These bushes are raised by means of hoppers on endless bands 61 (Figs. 2 and 3) driven by the pulleys 63, 64, 65 with the tension wheels 66. That arrangement is not essentially novel and is much used in the manufacture of buttons. The bushes thus placed on the bands accumulate in the gutters 71 and are then pushed onto the carrier plates 1 and 2 by the feeding plungers 72. At the right for example the caps placed pell mell in each hopper with an inclined floor are raised by a movable bottom provided with suitable notches and fall successively upon the endless band 61 which draws them into the gutter 71 where they accumulate waiting until the plunger 72 passes them in turn to 7 where they are seized by the punch 22 and caused to engage in the plate 2 (Fig. 4).

The plungers 72 are actuated by means of levers 73 operated by projecting shoulders 74 on the cross-head 14 of the machine, the plungers and levers being equipped with springs 75, 76 to avoid accidents in case of untimely blocking of the machine.

At the left side of the machine the bush when leaving the inclined hopper falls into a helical channel in such a manner that it is delivered on the endless band with the ends upward, while at the right side of the machine the caps have their ends downward.

The use of the endless band combined with the plunger 72 allows this essential result to be obtained, that is feeding as desired by hand or by an automatic hopper and this could be done without taking away any parts of the machine.

The bush pushed by the plunger is seized by a small detent 77 controlled by a spring 78 (Fig. 3). These detents sustain the bush during the rotation of the plate which moves below them until the plunger 15 comes into position to drive it into the plate.

On the two sides the arrangement of the gutter is such that when it is completely supplied the new bushes arriving then are pushed sidewise and fall back into the hoppers as indicated by the arrows 79. Thus there is no blocking of the machine.

I claim—

1. In a button making machine, the combination of a pair of coöperating, relatively-movable work carriers provided with feeding notches; tools operable on the work on said carriers; a pawl carrier; pawls carried thereby and engageable in said notches to feed said work carriers relatively to the tools; a drive shaft; a link eccentrically connected therewith at one end; a bell-crank lever having one arm operatively connected with the pawl carrier; a pin-and-slot connection between the other arm of the bell-crank lever and the other end of said link; and a weight operatively associated with said bell-crank lever.

2. In a button making machine, the combination of a pair of peripherally-notched, rotatable plates adapted to receive and transport pieces of material, said plates overlapping each other at one point, so that the pieces of material on one plate will be superposed with relation to those on the other plate on reaching such point; tools for acting on the material, including a tool for assembling the pieces in superposed position; and mechanism for rotating said plates.

3. In a button making machine, the combination of a pair of peripherally-notched, rotatable plates adapted to receive and transport pieces of material, said plates overlapping each other at one point, so that the pieces of material on one plate will be superposed with relation to those on the other plate on reaching such point; tools for acting on the material, including a tool for assembling the pieces in superposed position; a drive shaft; and mechanism operated from said shaft for rotating said plates and including a lost-motion device for preventing rotation of the plates when the latter are accidentally blocked.

4. In a button making machine, the combination of a pair of peripherally-notched, rotatable plates adapted to receive and transport pieces of material, said plates overlapping each other at one point, so that the pieces of material on one plate will be superposed with relation to those on the other plate on reaching such point; tools for acting on the material, including a tool for assembling the pieces in superposed position; a pawl carrier; pawls carried thereby and engageable in the notches in said plates to rotate the latter relatively to the tools; a drive shaft; a link eccentrically connected therewith at one end; a bell-crank lever having one arm operatively connected with the pawl carrier; a pin-and-slot connection between the other arm of the bell-crank lever and the other end of said link; and a weight operatively associated with said bell-crank lever.

5. In a button making machine, the combination of a pair of coöperating, relatively-movable work carriers; tools for operating on the work on said carriers; a drive shaft; mechanism operated therefrom for feeding the carriers relatively to the tools; a clutch on the drive shaft; and mechanism operated automatically from said shaft for controlling the periodic opening and closing of the clutch.

6. In a button making machine, the combination of a pair of coöperating, relatively-movable work carriers; tools for operating on the work on said carriers; a drive shaft; mechanism operated therefrom for feeding the carriers relatively to the tools and including a lost-motion device for preventing feeding when the carriers are accidentally blocked; a clutch on the drive shaft; and mechanism operated automatically from said shaft for controlling the periodic opening and closing of the clutch.

7. In a button making machine, the combination of a pair of coöperating, relatively-movable work carriers; tools for operating on the work on said carriers; a drive shaft; mechanism operated therefrom for feeding the carriers relatively to the tools; a clutch on the drive shaft; a cam fixed to said shaft; a rocking element having a projection disposed in the path of said cam for operation thereby; an uncoupling device for the clutch; and means operated by the movement of the rocking element for automatically controlling the movements of the unclutching device.

In testimony whereof I have signed my name to this specification in the presence of two subscribing witnesses.

HENRI TOURNEUR.

Witnesses:
 Jules Fayollet,
 André Bordillou.